Feb. 18, 1936.    C. W. MEYER    2,031,325
EYELET ASSEMBLY
Filed May 20, 1932
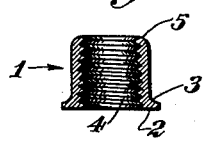
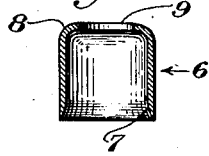
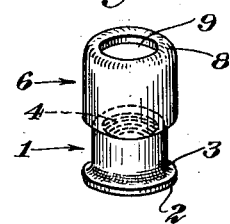
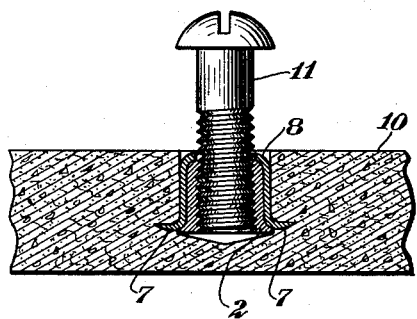
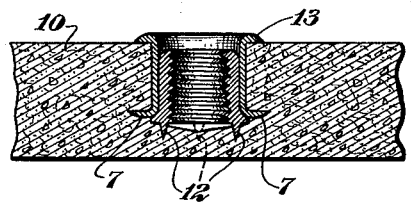
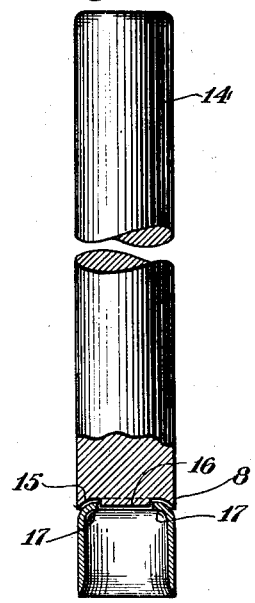
INVENTOR
Carl W. Meyer
BY D. N. Halstead
ATTORNEY Patented Feb. 18, 1936

2,031,325

UNITED STATES PATENT OFFICE 2,031,325

EYELET ASSEMBLY

Carl W. Meyer, New York, N. Y., assignor to Johns-Manville Corporation, New York, N. Y., a corporation of New York Application May 20, 1932, Serial No. 612,398

6 Claims. (Cl. 72—105)

This invention relates to an eyelet or fastener assembly and method of making the same and particularly to such an assembly adapted to receive a fastening element, such as a screw, and to secure it within a hole in a unit of structural material.

In a preferred embodiment, the invention comprises a bushing or sleeve fitting around a setting member and within a hole in a unit of structural material or the like and flared at one end into a continuous terminal portion that penetrates the side wall of the hole.

A structural material in which the eyelet may be installed is one containing asbestos fibers and Portland cement. A preformed unit of such materials may be made in a process that is conventional, as, for example, by making a wet mixture of equal parts by weight of asbestos fibers and Portland cement, forming the mixture into a layer, and then strongly compressing the layer, whereby excess of water is removed, the mixture is densified, and the mass is shaped into a sheet of desired shape and surface, such as plane or corrugated. The sheet is then allowed to set until the cement therein is hydrated.

The resulting product is hard and difficult to equip satisfactorily with a screw or other fastening device that may be concealed from view from one side of the sheet. The wedging of fastening devices within a hole extending into but not completely through the sheet is not entirely satisfactory. Also, the use of devices provided with clinching points is not satisfactory; either the points may bend before penetrating the hard sheet or they may cause breakage of the sheet, if they are sufficiently heavy to prevent bending.

An object of the present invention is to overcome the difficulties that have been encountered in securing fastening devices within a preformed unit of structural material of the kind described and to provide an improved eyelet assembly. Other objects and advantages will appear as the description of the invention progresses.

An embodiment that is now preferred is indicated in the drawing in which

Fig. 1 shows a cross section of a setting member adapted for use in an eyelet assembly.

Fig. 2 shows a cross section of a bushing adapted for use with the setting member of Fig. 1.

Fig. 3 shows a perspective view of a setting member and bushing partly assembled.

Fig. 4 shows a cross section of an eyelet assembly comprising a unit of structural material provided with a hole extending partly through the unit and an eyelet engaged therein and disposed around a setting member. The figure shows also a screw in position within the threaded interior surface of the setting member.

Fig. 5 shows a cross section of a modification of the invention in which the setting member is provided with elements that penetrate the structural material in such manner as to prevent turning of the setting member within a hole in the structural material and in which the outer bushing member extends over the outer edge of the hole.

Fig. 6 shows a view, partly in section, of a driving tool applied to a bushing that is to be driven into engagement in a sheet of hard material.

In the various figures like reference characters denote like parts.

Thus, 1 represents a setting and reenforcing member provided with an enlarged portion 2 at an end thereof. The straight portion of the setting member may have the form of a hollow cylinder and expand in curved manner, as indicated at 3, into the enlarged portion. The enlarged portion is suitably a narrow flange on the end of the setting member that is deepest in a hole in a unit of structural material when an assembly such as illustrated in Figs. 4 and 5 is made. The setting member may be adapted to receive a screw, by being provided with a threaded inner surface 4. The end of the setting member that is remote from the end provided with the enlarged portion may be curved as illustrated at 5, to facilitate placing a bushing over the setting member, as illustrated in Fig. 3.

The bushing member 6 may be provided, during manufacture, with a tapered or sharpened end or lower edge as indicated at 7, an upper portion curved inwardly as at 8, and a hole 9 to make possible the insertion of a screw through the bushing.

The assembly of setting member and bushing ilustrated in Fig. 3 may be placed in a hole in a unit of structural material 10. Then the bushing may be driven downward alongside the wall of the setting member and over the enlargement 2 at the lower end thereof that constitutes a clinching anvil. As the bushing is driven over the enlargement, the end 7 of the bushing is flared into a continuous, outwardly extending, circular portion that penetrates the side wall of the hole in the unit of structural material and thus becomes firmly engaged therein. When the bushing has a flared portion of wall that is relatively thin, the penetration of this flared portion into the structural material, such as a preformed unit of asbestos and Portland cement, does not cause rupture of the unit. The member 1, in addition to serving as a setting member, functions also as a reenforcing member. The reenforcement provided by this member minimizes the danger of bending or distortion of the bushing as it is forced downward, in snugly fitting relationship, between the outside wall of the rigid setting member and the inside of the hole in the unit of structural material. Since the bushing may fit snugly around the inner or setting member and within the hole, over a substantial length thereof, looseness and wabbling of the bushing within the hole may be minimized.

When the setting member is a hollow bushing and provided with a threaded interior surface 5, a screw 11 may be inserted therein as illustrated in Fig. 4. Such a structure provides a projecting fastening element that may be used, for example, in supporting a unit of structural material in a wall assembly. The screw is engaged within the setting member. The setting member is engaged, as by means of the enlarged portion 2 thereon, within the bushing, and the bushing, in turn, is secured within the unit of structural material.

To avoid turning of the setting member, within the hole, as the screw 11 or the like is turned therein, there may be provided one or more elements for preventing turning of the setting member. Thus, there may be provided pointed projections 12, on the bottom of the setting member, adapted to penetrate into the structural material as the eyelet and setting member are driven into place. Also, the eyelet may be flared at its upper end into a continuous preformed rim portion or flange 13 that projects over the top edge of the hole in the structural material, as indicated in Fig. 5.

A specific example of a structure made in accordance with the present invention and a method of making the same may be described as follows:

In a hardened sheet of asbestos and Portland cement that is 0.5 inch thick, there is formed a hole of diameter 0.375 inch and depth 0.32 inch. There is then formed an eyelet and setting member assembly of the type illustrated in Fig. 3. The parts may be made by conventional machines and methods. The wall of the setting member should be rather thick, to permit of a deep, strong thread being formed therein with preservation of rigidity of wall. Also, the material of construction may be cold rolled steel or other rigid metal that is not readily deformed or bent by a light blow, say, of a hammer. The cylindrical setting member 1 may have an outside diameter of 0.370 inch at the enlarged portion and 0.328 inch in the long, straight portion and an overall length of 0.250 inch. The bushing 6 may have an inside diameter of 0.330 inch and an outside diameter of 0.370 inch, in the straight portion, and an overall length of 0.330 inch. The bushing may be of a more ductile metal than the setting member, as, for example, brass. When the eyelet and setting member assembly has been seated in the hole in the unit of structural material, the bushing is forced down over the enlargement 2, at an end of the setting member, and is thereby expanded or flared at the lower end and caused to penetrate the side wall of the hole. Then the screw 11 may be inserted.

In forcing the bushing over the clinching anvil 2 and into the structural material, distortion of the bushing, particularly in the curved upper portion, should be minimized. This may be accomplished by the use of a tool or forcing means 14 (Fig. 6). This tool is suitably provided with a curved portion 15 adapted to rest upon the curved upper portion 8 of the bushing and to conform thereto over a substantial area. The forcing means may be provided also with a central portion 16 fitting into the hole 9 in the bushing and terminating flush with the inner side of the wall of the hole, as illustrated at 17. Such a tool minimizes the danger of deforming not only the bushing but also the top and thread of the setting member, during driving of the bushing.

When a plurality of metals or alloys or other materials of differing solution tension are used in the various members of the eyelet assembly, electrolysis may be minimized by the application to all parts of a corrosion-resistant coating, of which metal plating of nickel, chromium, or other non-corrodible metal is an example.

While the invention has been described particularly as adapted for use in stone-like units of structural material, such as hardened panels of asbestos and Portland cement, the invention is useful in combination with other materials, as, for example, in a wooden unit, such as the back of a picture frame, or in positions in structural materials where it is desired alternately to insert and remove a screw, at intervals, without weakening the engagement of the screw. The invention provides means whereby a good, durable threaded surface may be had in a great variety of materials.

The details that have been given are for the purpose of illustration and not limitation, and many variations therefrom may be made without departing from the scope of the invention.

What I claim is:

1. In combination, a preformed unit of structural material provided with a hole extending partly through the unit, an eyelet engaged therein, said eyelet comprising an outer bushing provided with an end flared into a continuous, terminal portion that penetrates the side walls of the said hole, and a setting and reenforcing member engaged within said outer bushing and provided with a threaded interior surface.

2. In combination, a preformed unit of structural material provided with a hole extending partly through the unit, an eyelet engaged therein, said eyelet comprising an outer bushing provided with an end flared into a continuous, terminal portion that penetrates the side walls of the said hole, and a setting and reenforcing member engaged within said outer bushing and provided with a threaded interior surface and provided also with an element penetrating the structural material, whereby turning of the setting and reenforcing member within the hole is prevented.

3. In combination, a preformed unit of structural material provided with a hole extending partly through the unit, an eyelet engaged therein, said eyelet comprising an outer bushing provided with an end flared into a continuous, terminal portion that penetrates the side walls of the said hole, and a setting and reenforcing member engaged, by means of an enlargement thereon of curved outer surface, within said outer bushing and provided with a threaded interior surface.

4. In combination, a preformed unit of asbestos and Portland cement or the like provided with a hole extending partly through the unit, a setting and reenforcing member disposed within the said hole, and a bushing fitting around the said member and flared at its lower end into a continuous terminal portion penetrating the wall of the said hole, the said bushing and member being provided with corrosion-resistant exterior surfaces, whereby deterioration of electrolysis is minimized.

5. In combination, a preformed unit of structural material provided with a hole extending partly through the unit, a setting and reenforcing member disposed within the hole, and a bushing fitting around the said member, at its lower end penetrating the wall of the hole, and at its upper end flared into a continuous preformed rim portion resting upon the material defining the top of the said hole.

6. In combination, a preformed unit of structural material provided with a hole extending partly through the unit, a flared setting and reenforcing member disposed within the hole and provided with irregularities of surface engaging the material of the wall of the hole, whereby turning of the setting and reenforcing member within the hole is prevented, and a bushing member disposed around the said setting and reenforcing member, shaped thereby in flaring manner and caused to engage the said structural material.

CARL W. MEYER.